United States Patent
Samms et al.

(10) Patent No.: US 7,204,156 B2
(45) Date of Patent: Apr. 17, 2007

(54) FUEL CELL SYSTEM HAVING FLUIDIC OSCILLATION FLOW METER

(75) Inventors: Stephen Samms, Mesa, AZ (US); Chowdary R. Koripella, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/192,819

(22) Filed: Jul. 29, 2005

(65) Prior Publication Data
US 2007/0022825 A1    Feb. 1, 2007

(51) Int. Cl.
G01F 1/20    (2006.01)
H01M 8/18    (2006.01)

(52) U.S. Cl. .................. 73/861.19; 429/20
(58) Field of Classification Search .......... None
See application file for complete search history.

(56) References Cited

U.S. PATENT DOCUMENTS

| | | | |
|---|---|---|---|
| 3,185,166 A | 5/1965 | Horton et al. | |
| 3,273,377 A | 9/1966 | Testeman et al. | |
| 3,373,600 A | 3/1968 | Taplin | |
| 3,640,133 A | 2/1972 | Adams | |
| 3,756,068 A | 9/1973 | Villarroel et al. | |
| 4,091,056 A * | 5/1978 | Hamalainen et al. | 261/19 |
| 4,150,561 A | 4/1979 | Zupanick | |
| 4,244,230 A | 1/1981 | Bauer | |
| 5,049,317 A * | 9/1991 | Kiske et al. | 261/16 |
| 5,630,878 A * | 5/1997 | Miyamoto et al. | 118/715 |
| 6,076,392 A | 6/2000 | Drzewiecki | |
| 6,179,277 B1 * | 1/2001 | Huston et al. | 261/128 |
| 6,362,115 B1 * | 3/2002 | Mandal | 438/780 |
| 6,553,844 B2 | 4/2003 | Drzewiecki | |
| 6,569,553 B1 * | 5/2003 | Koripella et al. | 429/20 |

OTHER PUBLICATIONS

Miroslav Husák, Fluidic Oscillator for Flowmeter, Eurosensors XII Sep. 13-16, 1998, pp. 773-774.
Carl Anderson et al., A Fluidic-Electronic Hybrid System for Measuring the Composition of Binary Mixtures, Ind. Eng. Chem. Fundam., vol. 11, No. 3, 1972, pp. 407-409.

* cited by examiner

Primary Examiner—Harshad Patel

(57) ABSTRACT

An apparatus (10) is provided for determining the flow rate of a gas. The apparatus comprises a housing (12) forming a vaporization chamber (14) for converting a fluid into a gas vapor when subjected to heat (22). An oscillation flow meter is formed within the housing (12), thereby being integrated with the vaporization chamber, for receiving the gas vapor and providing a frequency signal (60) indicative of the rate of flow of the gas vapor.

11 Claims, 2 Drawing Sheets

FUEL CELL SYSTEM HAVING FLUIDIC OSCILLATION FLOW METER

FIELD OF THE INVENTION

The present invention generally relates to an apparatus for measuring the amount of fluid flowing in a channel, and more particularly to a fluidic oscillation flow meter for determining the flow rate of a gas.

BACKGROUND OF THE INVENTION

Fluidic oscillator flow meters are well known in the art. See for example, Horton et al., U.S. Pat. No. 3,185,166; Testerman et al., U.S. Pat. No. 3,273,377; Taplin, U.S. Pat. No. 3,373,600; Adams et al., U.S. Pat. No. 3,640,133; Villarroel et al., U.S. Pat. No. 3,756,068; Zupanick, U.S. Pat. No. 4,150,561; Bauer, U.S. Pat. No. 4,244,230; and Drzewiecki, U.S. Pat. No. 6,553,844. These conventional fluidic oscillators comprise a fluidic amplifier having two channels with the outputs fed back to the input to produce a free running oscillation wherein the fluid alternatively flows through one channel then the other by means of the fluid fed back being transversely applied to the input stream thereby forcing the input to the other channel.

Most fluidic oscillator flow meters measure some characteristic, e.g., volumetric flow, density, quality, enthalpy, and bulk modulus of a fluid. In the case of measuring volumetric flow, this is typically accomplished by measuring the frequency of the fluid shifting from one channel to the other. The frequency is linearly related to the volumetric flow because the flow transit time is related to flow velocity. Since the amplifier nozzle area is known, the product of velocity and area yields volumetric flow. In most cases, the acoustic feedback time for most fluids can be designed to be only a few percent of the total flow transit time.

In U.S. Pat. No. 6,076,392, the constituents of a gas mixture are determined by measuring both the flow of the fluid sample stream and the speed of sound in the fluid. A measure of the volumetric flow is required to determine the properties density and viscosity of the fluid sample, and a measure of the speed of sound is required to determine the property specific heat of the fluid.

In "A Fluidic-Electronic Hybrid System for Measuring the Composition of Binary Mixtures", Anderson et al., Ind. Eng. Chem. Fundam., Vol. 11, No. 3, 1972, it has been shown that the density of a gas may be determined by use of an oscillation flow meter for gasses with temperatures ranging from −20 to +120° C. The speed of a pressure pulse traveling through a gas (sonic velocity) is proportional to the square root of the gas density. However, the disclosed system requires a separate liquid vaporizer.

Accordingly, it is desirable to provide a fluidic oscillation flow meter integrated within a fuel cell for measuring the volumetric flow rate of elevated temperature vapor. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An integrated vaporizer and flow meter is provided for determining the flow rate of a gas. The apparatus comprises a housing forming a vaporization chamber for converting a fluid into a gas vapor when subjected to heat. An oscillation flow meter is formed within the housing, thereby being integrated with the vaporization chamber, for receiving the gas vapor and providing a frequency signal indicative of the rate of flow of the gas vapor.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
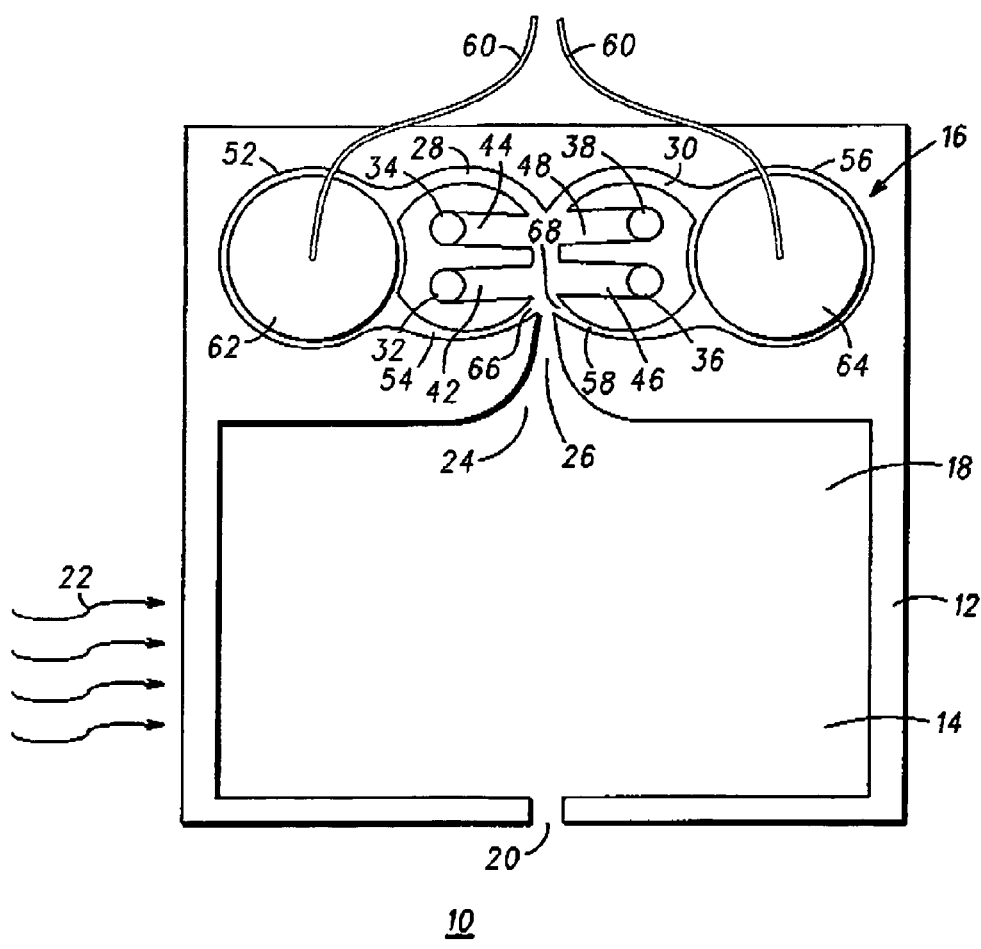
FIG. 1 is a schematic diagram of a fluidic oscillation flow meter in accordance with an exemplary embodiment of the present invention.

Referring to FIG. 1, a gas oscillation flow meter 10 in accordance with an exemplary embodiment of the present invention includes a vaporization chamber 14 and a flow meter 16 within a housing 12. Ideally the device should be able to operate from a minimum of the boiling point temperature of the measured fluid to a maximum of the temperature of a secondary process. The housing 12 comprises a material able to withstand high temperatures, such as a metal, but would preferably comprise ceramic. The vaporization chamber 12 optionally includes a porous material 18 spaced throughout. The porous material 18 may comprise zirconia or alumina, for example. The porous material 18 improves the spreading of the fluid resulting in an improved uniform evaporation.

The flow meter 16 comprises a flow meter inlet nozzle 26 and first and second diversion channels 28, 30. Vents 32, 34, 36, and 38 (output vias) are accessible through output channels 42, 44, 46, 48. Piezo chamber 52 is spaced between the first diversion channel 28 and a first return channel 54, and piezo chamber 56 is spaced between the second diversion channel 30 and a second return channel 58. A piezo device 62 is positioned within piezo chamber 52 and a piezo device 64 is positioned within piezo chamber 56. In some embodiments, e.g., a multi-layer ceramic embodiment, the various elements may reside on different levels. For simplicity, the various components are shown in FIG. 1 as being on the same level.

In operation, a liquid is provided into the chamber 14 at the inlet 20. The liquid may comprise, for example, a methanol and water mixture (such as may be used in a fuel cell system to be described subsequently in more detail). The liquid will saturate a portion of the porous material 18. Heat 22 is applied to the chamber 14, either by actively heating the chamber or by reclaiming waste heat from a thermally coupled secondary process, resulting in a gas vapor exiting the chamber 14 at outlet 24. The desired temperature of heat is above the maximum boiling temperature of the inlet fluid and below the thermal constraints of the construction materials.

The gas vapor exiting the outlet 24 enters the flow meter inlet nozzle 26 having a certain velocity. As the gas vapor proceeds into the flow meter 16, the majority of the gas vapor will enter either the first or second diversion channel. For example, the gas vapor might enter diversion channel 28, and proceed around through piezo chamber 52 and first return channel 54, passing through the first nozzle 66. As the gas vapor passes through first nozzle 66, it impacts the gas vapor entering at flow meter inlet nozzle 26, deflecting the entering gas vapor and causing the majority of the entering gas vapor to now divert to the second diversion channel 30. The gas vapor would then proceed around through piezo chamber 56 and second return channel 58, passing through the second nozzle 68. As the gas vapor passes through second nozzle 68, it impacts the gas vapor entering at flow meter inlet nozzle 26, deflecting the entering gas vapor and causing the majority of the entering gas vapor to again enter the first diversion channel 28. This switching from one side of the flow meter 16 to the other will continue in a cyclic fashion having a certain frequency depending on the rate of flow of the gas as long as gas vapor enters the flow meter 16.

As gas vapor fills the flow meter 16 and the pressure builds, gas vapor will enter output channels 42, 44, 46, 48 and exit the flow meter 16 through vents 32, 34, 36, 38. The vents 32, 34, 36, 38 may converge into a single outlet (not shown). Additionally, though four vents 32, 34, 36, 38 are shown, any number of vents may be used. Typically, an equal number of vents would be positioned on both sides.

As the gas vapor passes through piezo chambers 52, 56, the pressure pulse is sufficient to trigger piezo devices 62, 64 thus generating an ac electrical signal 60 indicative of the frequency of the oscillatory nature of the flow meter 16. The frequency of the gas shifting from one channel 28, 30 to the other is approximately linearly related to the volumetric flow.

The gas oscillation flow meter 10 may be used most effectively in any application that consumes liquid fuel and operates at temperatures above the boiling point of that fuel, e.g., internal combustion engine, microreactors, and more specifically fuel cells. Fuel cells are electrochemical cells in which a free energy change resulting from a fuel oxidation reaction is converted into electrical energy. Reformed Hydrogen Fuel Cells (RHFCs) utilize hydrogen fuel processed from liquid or gaseous hydrocarbon fuels, such as methanol, using a reactor, called a fuel reformer, for converting the fuel into hydrogen. Methanol is the preferred fuel for use in fuel reformers for portable applications because it is easier to reform into hydrogen gas at a relatively low temperature compared to other hydrocarbon fuels such as ethanol, gasoline, or butane. The reforming or converting of methanol into hydrogen usually takes place by one of three different types of reforming. These three types are steam reforming, partial oxidation reforming, and autothermal reforming. Of these types, stean reforming is the preferred process for methanol reforming because it is the easiest to control and produces a higher concentration of hydrogen output by the reformer, at a lower temperature, thus lending itself to favored use.

Utilizing multilayer laminated ceramic technology, ceramic components and systems are now being developed for use in microfluidic chemical processing and energy management systems, e.g., fuel cells. Monolithic structures formed of these laminated ceramic components are inert and stable to chemical reactions and capable of tolerating high temperatures. These structures can also provide for miniaturized components, with a high degree of electrical and electronic circuitry or components embedded or integrated into the ceramic structure for system control and functionality. Additionally, the ceramic materials used to form ceramic components or devices, including microchanneled configurations, are considered to be excellent candidates for catalyst supports and so are extraordinarily compatible for use in microreactor devices for generating hydrogen used in conjunction with miniaturized fuel cells. An example of a fuel cell formed in a ceramic material is disclosed in U.S. Pat. No. 6,569,553.

Figure 2:
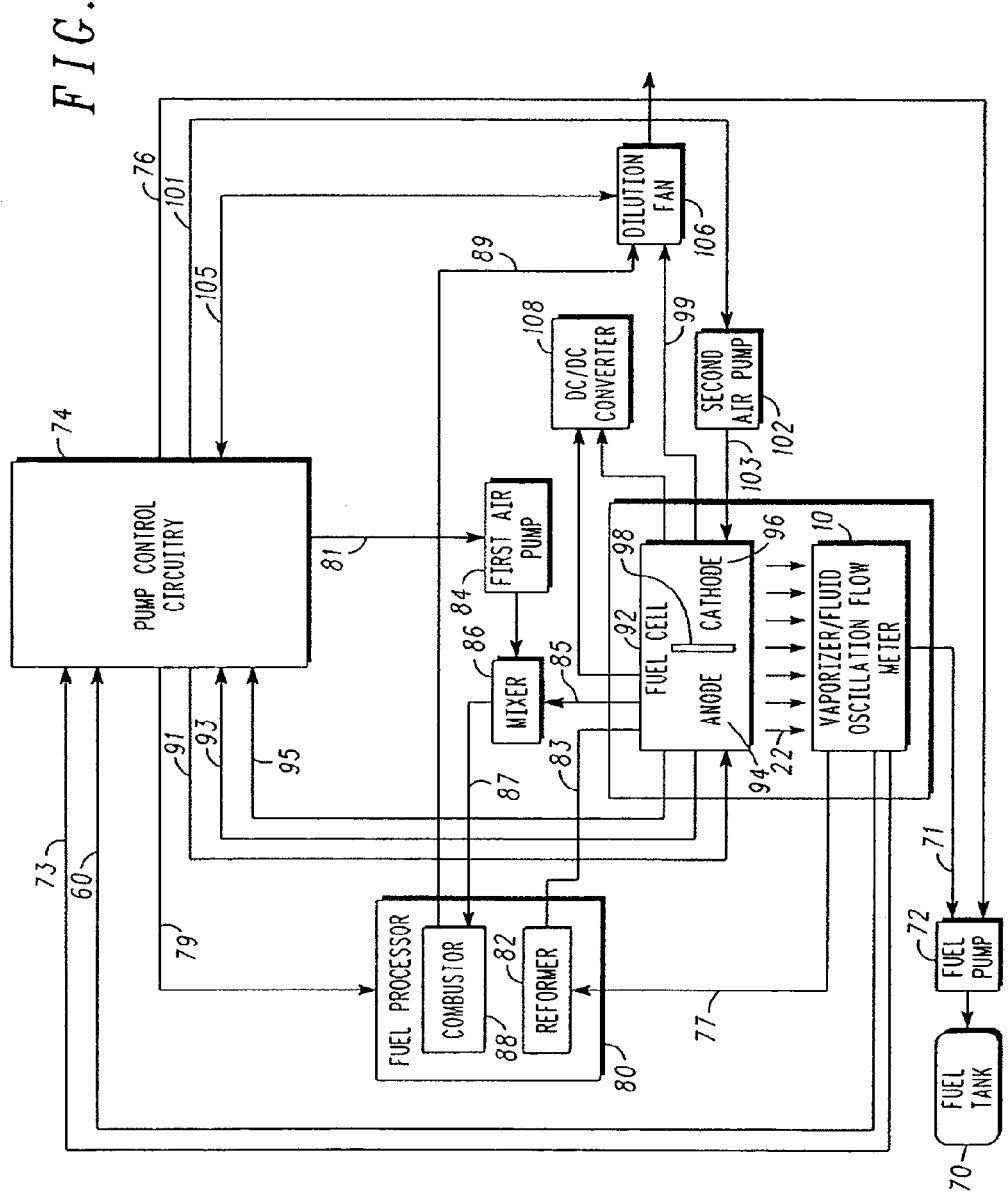
FIG. 2 is a block diagram of a fuel cell system including the fluidic oscillation flow meter of FIG. 1.

A simplified block diagram of a fuel cell system, including an exemplary embodiment of the fluidic oscillation flow meter 10, is shown in FIG. 2. A mixture 70 of methanol and water is supplied by a fuel pump 72 via fuel line 71 to the fluidic oscillation flow meter 10. The mixture 70 of methanol and water is converted to a gas vapor as previously explained. Heat 22 is supplied to the gas oscillation flow meter 10 by the waste heat of a fuel cell 92 (an electric heater, not shown, may provide heat for startup). A frequency signal 60 is generated, as previously discussed, as well as a vapor temperature signal 73, and supplied to micro-controller 74. The micro-controller 74 forwards a control signal 76 to the fuel pump 72 for controlling the amount of fuel pumped in response to the frequency signal 60. Each frequency relates proportionally to a specific flow rate. The pump control circuitry 74 determines the flow rate based on the frequency signal 60 and the vapor temperature signal 73 and directs the fuel pump 72 via the control signal 76 to increase, decrease, or maintain the fuel flow rate.

The gas vapor exits the fluidic oscillation flow meter 10 via line 77 and enters a reformer section 82 of a fuel processor 80. A first air pump 84 pumps preferably air, Though any oxidant could be used, to a mixer 86, for mixing the air with fuel received from the fuel cell 92 via line 85. The micro-controller 74 determines the speed of the flow rate of the first air pump 84 and controls the speed thereof with the combustor pump control signal 81. The mixture of air and fuel is fed via line 87 to a combustor 88 for supplying heat to the reformer 82. A heater control signal 79 from the micro-controller 74 to the combustor 88 controls the amount of heat generated by the combustor 88 for optimum operation of the reformer 82. The reformer supplies hydrogen vapor via line 83 to the anode 94 of the fuel cell 92.

The fuel cell 92 comprises a fuel electrode, or anode 94, and an oxidant electrode, or cathode 96, separated by an ion-conducting electrolyte 98. The electrodes 94, 96 are connected electrically to a load (such as an electronic circuit) by an external circuit conductor (not shown). In the circuit conductor, electric current is transported by the flow of electrons, whereas in the electrolyte 98, it is transported by the flow of ions, such as the hydrogen ion ($H^+$) in acid electrolytes, or the hydroxyl ion ($OH_-$) in alkaline electrolytes. In theory, any substance capable of chemical oxidation that can be supplied continuously (as a gas or fluid) can be oxidized galvanically as the fuel at the anode of a fuel cell. Similarly, the oxidant, supplied via line 103 by second air pump 102, can be any material that can be reduced at a sufficient rate. Gaseous hydrogen has become the fuel of choice for most applications, because of its high reactivity in the presence of suitable catalysts and because of its high power density. Similarly, at the fuel cell cathode 96, the most common oxidant is gaseous oxygen, which is readily and economically available from air for fuel cells used in terrestrial applications. When gaseous hydrogen and oxygen are used as fuel and oxidant, the electrodes 94, 96 are porous to permit the gas-electrolyte junction area to be as great as possible. The electrodes 94, 96 must be electronic conductors, and possess the appropriate reactivity to give significant reaction rates. At the anode 94, incoming hydrogen gas is oxidized to produce hydrogen ions (protons) and electrons. Since the electrolyte is a non-electronic conductor, the electrons flow away from the anode 94 via an external electrical circuit. At the cathode 96, oxygen gas is reduced and reacts with the hydrogen ions migrating through the electrolyte 98 and the incoming electrons from the external circuit to produce water as a byproduct. The byproduct water is typically expelled as vapor at elevated temperatures via line 99. The overall reaction that takes place in the fuel cell is the sum of the anode 94 and cathode 96 reactions, with part of the free energy of reaction released directly as electrical energy. The difference between this available free energy and the heat of reaction is produced as heat at the temperature of the fuel cell 92. It can be seen that as long as hydrogen and oxygen are supplied to the fuel cell 92, the flow of electric current will be sustained by electronic flow in the external circuit and ionic flow in the electrolyte.

In practice, a number of these unit fuel cells 92 are normally stacked or 'ganged' together to form a fuel cell assembly. A number of individual cells are electrically connected in series by abutting the anode current collector of one cell with the cathode current collector of its nearest neighbor in the stack.

The micro-controller 74 controls the overall operation of the system. For example, the operating point of the fuel cell 92 is controlled by a heater control signal 91 from the micro-controller 74 in response to a temperature signal 93 and a cell voltage signal 95 from the fuel cell 92. The amount of oxidant supplied to the cathode 96 by the second air pump (or blower) 102 is controlled by the cathode blower signal 101 from the micro-controller. Exhaust from the fuel cell 92 via line 99 through dilution fan 106 is controlled by the micro-processor 74 via dilution fan signal 105. A DC-DC converter 108 receives electrical current produced by the fuel cell 92 and provides power to the micro-controller 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A fuel cell system formed within a ceramic structure for converting a liquid fuel to an electrical current, comprising:
    a gas oscillation flow meter consisting of:
        a vaporizer chamber integrated within the ceramic structure and receiving the liquid fuel and converting the liquid fuel into a gas vapor when subjected to heat; and
        an oscillation flow meter formed within the ceramic structure, thereby being integrated with the vaporization chamber, and receiving the gas vapor and providing a frequency signal indicative of the rate of flow of the gas vapor;
    a fuel processor receiving the gas vapor from the oscillation flow meter and producing reformed hydrogen;
    a fuel cell receiving reformed hydrogen from the fuel processor and producing the electrical current and the heat for the vaporizer chamber; and
    a fuel pump pumping the liquid fuel to the vaporization chamber at a flow determined in response to the frequency signal.

2. The apparatus of claim 1 further comprising a porous material positioned within the vaporization chamber.

3. The apparatus of claim 2 wherein the porous material comprises zirconia or alumina.

4. The apparatus of claim 1 wherein the oscillation flow meter comprises:
    an inlet for receiving the gas vapor;
    first and second diversion channels for alternatively receiving the gas vapor from the inlet;
    a first nozzle for receiving the gas vapor from the first diversion channel and deflecting the flow of gas vapor from the inlet into the second diversion channel;
    a second nozzle for receiving the gas vapor from the second diversion channel and deflecting the flow of gas vapor from the inlet into the first diversion channel;
    a first sensor positioned in the first diversion channel for detecting the flow of gas vapor and generating the frequency signal; and
    an outlet for the gas vapor.

5. The apparatus of claim 4 wherein the first sensor comprises one of a piezo-electric element or a piezo-resistive element integrated into the housing.

6. The apparatus of claim 4 further comprising a second sensor positioned in the second diversion channel for detecting the flow of gas vapor and generating the frequency signal in conjunction with the first sensor.

7. An apparatus comprising:
    a housing forming:
        an inlet for receiving a fluid;
        a gas oscillation flow meter consisting of:
            a vaporization chamber for converting the fluid into a gas vapor flow when subjected to heat;
            a flow meter comprising:
                first and second diversion channels for alternatively receiving the gas vapor flow from the vaporization chamber;
                a first nozzle for receiving the gas vapor flow from the first diversion channel;
                a second nozzle for receiving the gas vapor flow from the second diversion channel, wherein the first and second nozzles alternatively deflect the gas vapor flow from the vaporization chamber into the second and first diversion channels, respectively; and
            at least one outlet for the gas vapor; and
    a first sensor positioned in the first diversion channel for detecting the flow of gas vapor;
    a fuel processor for receiving the gas vapor flow from the flow meter; and
    a fuel cell receiving reformed hydrogen from the fuel processor and providing one of electricity or mechanical power and the heat for the vaporization chamber;
    a fuel pump pumping the fluid to the vaporization chamber at a flow determined in response to the first sensor.

8. The apparatus of claim 7 further comprising a porous material positioned within the vaporization chamber.

9. The apparatus of claim 7 wherein the porous material comprises zirconia or alumina.

10. The apparatus of claim 7 vaporization chamber and the flow meter are formed within a ceramic material.

11. The apparatus of claim 7 further comprising a second sensor positioned in the second diversion channel for detecting the flow of gas vapor in conjunction with the first sensor.

* * * * *